United States Patent [19]

Hosilyk et al.

[11] Patent Number: 4,635,876
[45] Date of Patent: Jan. 13, 1987

[54] TAPE PICKER AND CLEANER

[75] Inventors: Randall E. Hosilyk, Costa Mesa; David J. Marley, Santa Ana; Rodney E. Hosilyk, Fountain Valley, all of Calif.

[73] Assignee: Rosstream Research Associates, Ltd., Cerritos, Calif.

[21] Appl. No.: 720,000

[22] Filed: Apr. 4, 1985

[51] Int. Cl.[4] .............................................. G11B 15/67
[52] U.S. Cl. ........................................ 242/195; 15/100
[58] Field of Search ................ 242/55, 55.17, 57, 180, 242/181, 186, 187, 191, 195, 206, 208; 360/128; 15/DIG. 13, 100

[56] References Cited

U.S. PATENT DOCUMENTS

| | | | |
|---|---|---|---|
| 3,370,982 | 2/1968 | Hayunga | 15/100 X |
| 3,672,754 | 6/1972 | Riedel | 242/195 X |
| 3,706,423 | 12/1972 | Neff | 242/195 |
| 3,722,988 | 3/1973 | Neudecker | 242/195 X |
| 3,767,210 | 10/1973 | Havens et al. | 360/128 X |
| 4,072,279 | 2/1978 | Lewis | 242/195 X |

Primary Examiner—Donald Watkins
Attorney, Agent, or Firm—Fulwider, Patton, Rieber, Lee & Utecht

[57] ABSTRACT

A tape picking device for use in threading a reel-to-reel tape drive, for picking a tape leader from a supply tape pack and automatically retracting from the tape pack upon completion of threading, without the use of electrical actuators. The device includes a an integral element that is lightly contacted by the threaded tape under tension, to pivot the picking device clear of the tape pack. The tape-contacting element may also be a tape-cleaning bar, or may be simply a tape guide, located on either side of the tape. A mechanical actuator is used to lift the picking device well clear of the tape pack for tape loading and unloading operations.

11 Claims, 11 Drawing Figures

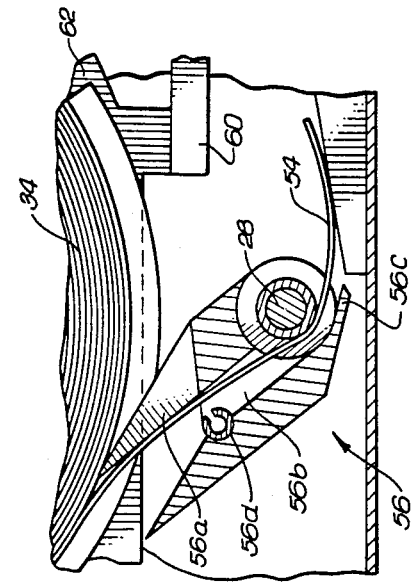
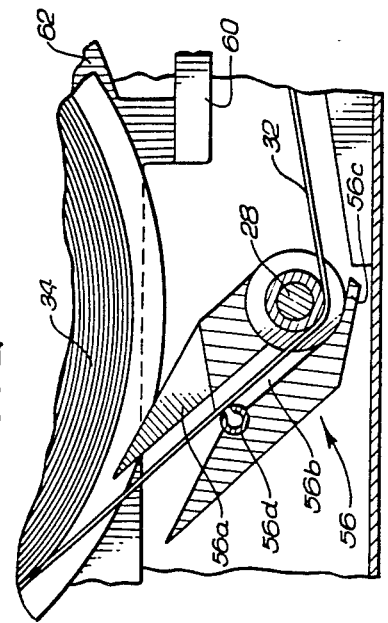
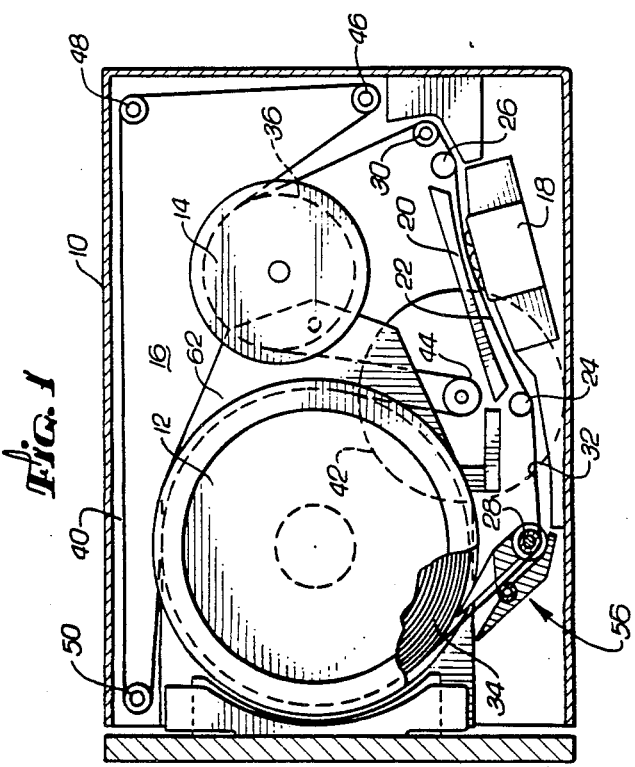
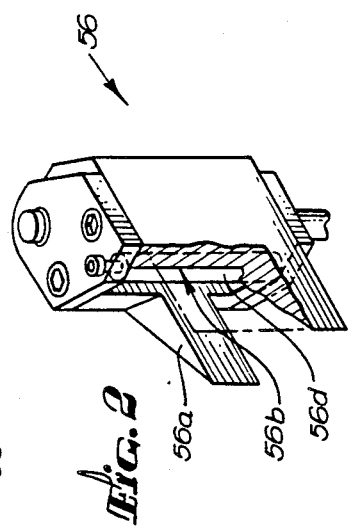

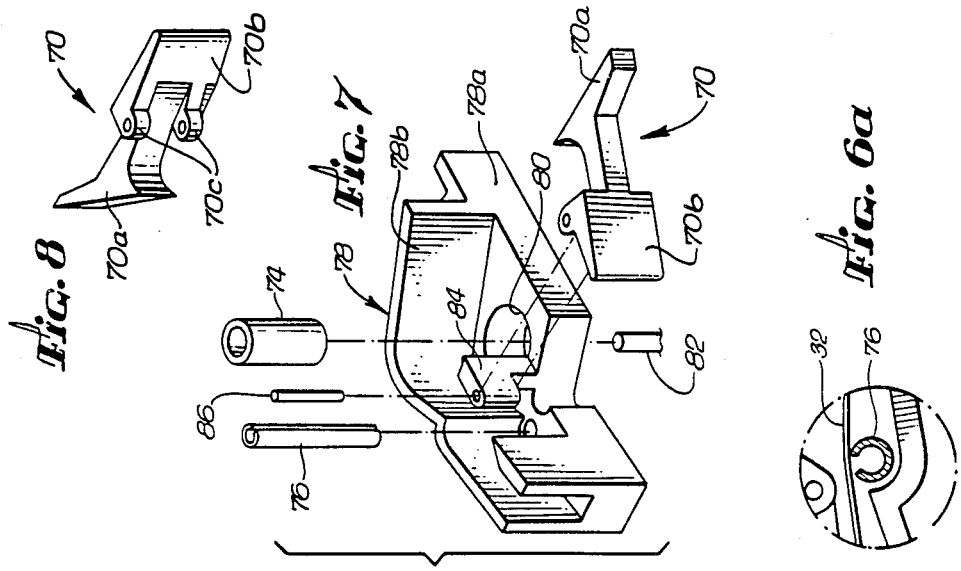
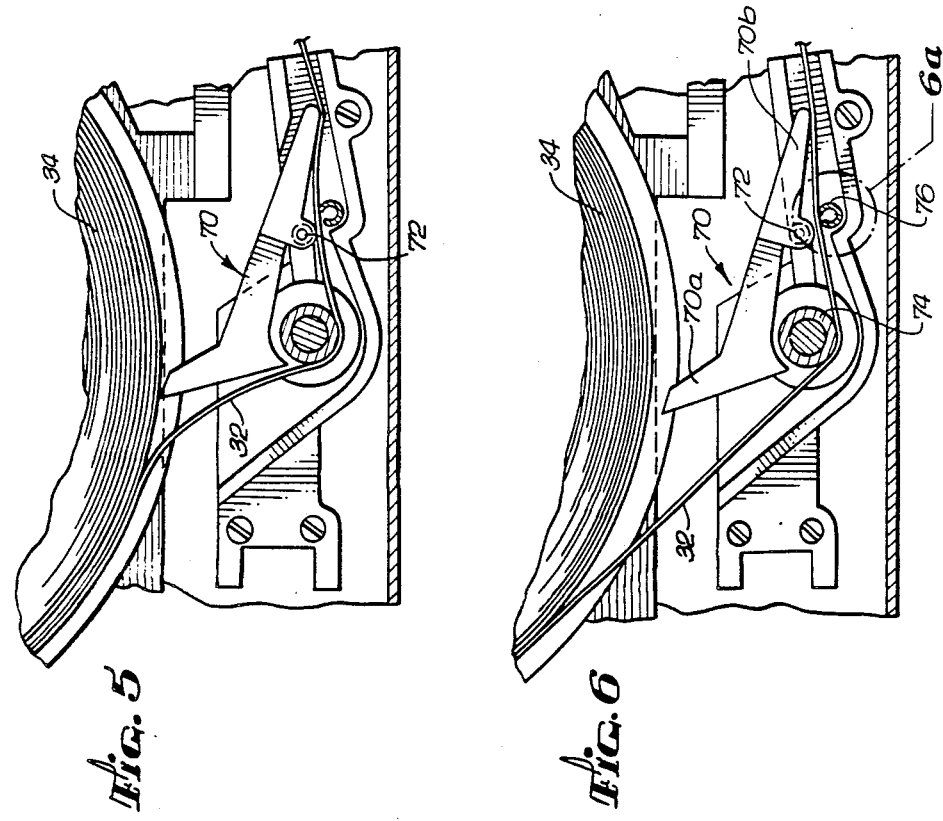

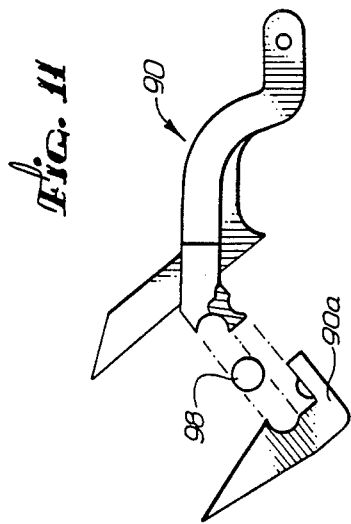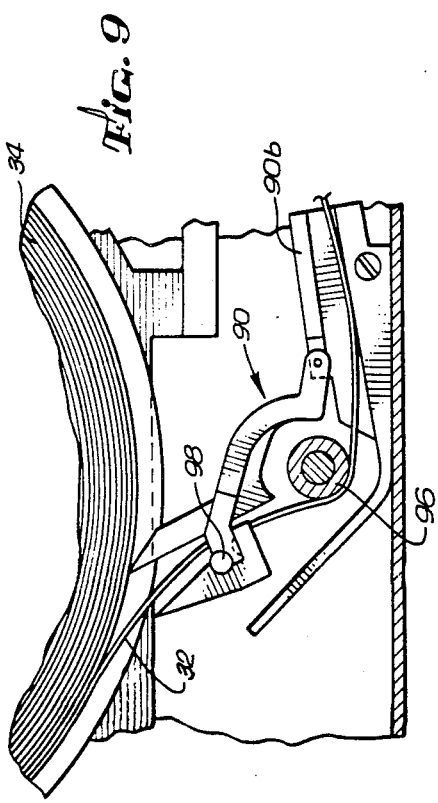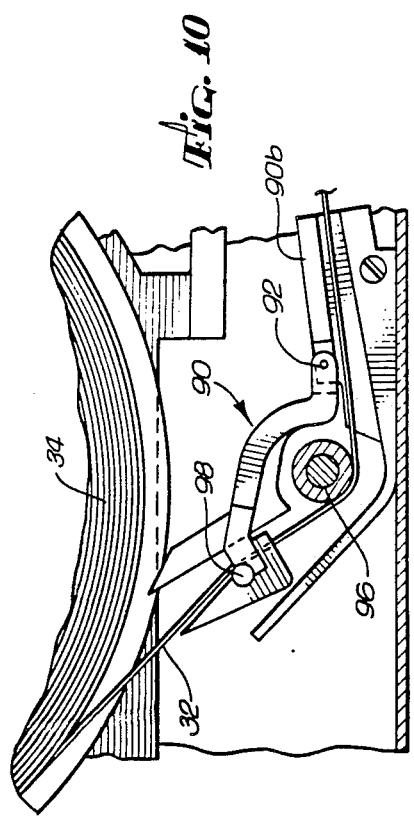

TAPE PICKER AND CLEANER

BACKGROUND OF TNE INVENTION

This invention relates generally to magnetic tape drive mechanisms, and more particularly, to reel-to-reel tape drive mechanisms, in which tape is driven from a supply reel to a take-up reel, and in which the supply reel is removable. In one specific type of reel-to-reel tape drive, the tape is driven by an endless drive belt engaging wound tape packs on both tape reels. Regardless of the method used to drive the tape from one reel to the other, reel-to-reel tape drives should ideally be self-threading, i.e. it should be possible to thread the tape automatically from the supply reel to the take-up reel, without operator intervention.

The usual approach is to employ a tape picker in conjunction with a relatively stiff tape leader. The tape leader is structured to be easily retained on the supply reel, such as by making it somewhat wider that the space between the reel flanges, or by including an adhesive on its lower surface. In any event, the tape leader is removably retained on the supply reel in a manner as to prevent inadvertent unraveling of the tape. The tape picker is a sharply tapered element, having a relatively sharp edge that is brought into contact with the periphery of the supply tape pack, to pick the leader from the pack and guide it in a desired direction, usually through a tape guide channel and into a position from which it can be captured by some mechanism for wrapping the tape about the take-up reel.

Once threading of the tape has been accomplished, the picker must be retracted from the tape pack, to prevent any unwanted resistance to the rotation of the supply reel. The normal technique for tape picking is to mount the picker on an arm that is movable in response to actuation of a solenoid. The solenoid is actuated only at the time that tape threading is to take place, after which it is deactivated to allow the picker to be retracted, by spring action, from the tape pack. Although this technique is satisfactory for most applications, it requires appropriate control circuitry to ensure that it will be operated at the proper time. Moreover, the need for a solenoid places a constraint on the use of space within a tape drive. For drives that are to be accommodated in limited space, there simply may not be room to provide a solenoid-actuated picker of the conventional type.

Accordingly, there is still a need for an improved tape picker, preferably one that functions automatically without the need for solenoids or other electrical components. The present invention satisfies this need.

SUMMARY OF THE INVENTION

The present invention resides in a tape picking device that operates automatically without any electrical controls. In addition, the tape picker of the invention performs a tape cleaning function without the need for separate tape cleaners or scrubbers.

Briefly, and in general terms, the tape picker of the invention comprises an integral tape guide around which the tape passes after leaving the supply tape pack, a picker body pivoted for rotation about an axis parallel or coincident with that of the tape guide, a sharply tapered portion extending from the body toward the supply tape pack, and a tape channel formed in the body and extending generally tangentially from the tape guide toward the tapered portion. The tape picker is torsionally biased to engage the tapered portion with the tape pack. The tape leader is picked from the pack, traverses the tape channel, and emerges from the picker body, to continue through the tape drive until threading is complete. When tension is subsequently applied to the tape, it contacts an integral element that functions to retract the tapered portion of the picker from the tape pack. In one disclosed embodiment, this element is a tape cleaner bar positioned on the side of the tape channel opposite the tapered portion. The geometry of the picker is such that the force of the tape on the cleaner bar is sufficient to lift the tapered portion of the picker clear of the tape pack. The torsional bias on the picker is then operative to urge the tape against the cleaner bar, providing a light scrubbing action to clean the tape as it leaves the supply reel.

Since the picker is lifted from the tape pack only after threading is completed, additional means must be provided to lift the picker from the tape pack during loading and unloading operations. This can be achieved by mechanical means appropriate to the loading and unloading technique. In the presently preferred embodiment of the invention, the supply reel is unloaded by sliding it on a support plate. The picker is disengaged by means of a camming strip attached to the supply reel support plate. As the supply reel is slid out of the tape drive, the camming strip engages the tapered portion of the tape picker, and rotates it well clear of the tape pack.

A second disclosed embodiment of the invention has a retractor arm that contacts the tape on its reverse face, to minimize wear of the tape. In this and in a third embodiment, the picker rotates about an axis that is parallel, but displaced from, that of the tape guide.

It will be appreciated from the foregoing that the present invention represents a significant advance in the field of reel-to-reel tape drives. In particular, the invention provides an automatic and wholly mechanical tape picker, which picks a tape leader from the tape pack and automatically retracts when threading is complete, without the need for solenoids or other electrical components. Other aspects and advantages of the invention will become apparent from the following more detailed description of the invention, taken in conjunction with the accompanying drawings.

BRIEF DESCRIPTION OF THE DRAWINGS

FIG. 1 is a plan view, partly in section, of a tape drive incorporating the tape picker of the invention;

FIG. 2 is an enlarged perspective view of the tape picker and cleaner of the invention;

FIG. 3 is a further enlarged plan view, partly in section, showing the picker in operation;

FIG. 4 is a view similar to FIG. 3, but showing the picker retracted and the cleaner bar in operation;

FIG. 5 is a plan view similar to FIG. 3, but showing a second embodiment of the picker in operation;

FIG. 6 is a plan view similar to FIG. 5, but showing the second embodiment of the picker retracted from the tape pack of the supply reel;

FIG. 7 is an exploded perspective view of the picker assembly shown in FIGS. 5 and 6;

FIG. 8 is a perspective view of the picker shown in FIG. 7 of the invention;

FIG. 9 is a plan view of a third embodiment of the picker of the invention;

FIG. 10 is a plan view similar to FIG. 9, but showing the picker of the third embodiment retracted from the tape pack of the supply reel; and FIG. 11 is an exploded plan view of the picker arm of the third embodiment.

DESCRIPTION OF THE PREFERRED EMBODIMENT

As shown in the drawings for purposes of illustration, the present invention is concerned with devices for picking tape from a supply reel in a reel-to-reel tape drive. Such a tape drive is shown in schematic plan view in FIG. 1, and includes a housing, indicated by reference numeral 10, and means for supporting a supply reel 12 and a take-up reel 14. The tape drive also includes a generally rectangular deck plate 16 on which various components are mounted. These include a read/write head 18, a read/write channel guide 20 forming a tape guide channel 22 with the read/write head, tape guides 24 and 26 at each end of the tape guide channel, a rotatable tape guide 28 between the guide 24 and the supply reel 12, and another rotatable guide 30 between the fixed guide 26 and the take-up reel 14. A magnetic recording tape, indicated at 32, follows a path from a tape pack 34 on the supply reel 12, around the guides 28 and 24, past the read/write head 18, around the tape guides 26 and 30, and finally onto a take-up tape pack 36 on the take-up reel 14.

The reels 12 and 14 are driven by means of a resilient drive belt 40, a drive motor 42 and a drive capstan 44. The capstan is located between the two reels 12 and 14, displaced laterally toward the tape guide 20. The path of the drive belt 40 extends from the capstan 44 between the two reels and around a peripheral portion of the take-up pack 36, around three guide pulleys 46, 48 and 50, and finally around a peripheral portion of the supply tape pack 34 and back to the capstan. A second drive belt (not shown) extends from the same drive motor to the shaft of the belt guide pulley 46. The second drive belt transmits braking torque and helps maintain proper tape tension.

Tape threading in drives of this general type involves first picking a tape leader 54 (FIG. 3) from the supply tape pack 34, threading the leader past the read/write head 18, and then engaging the leader with the take-up reel 14. In accordance with the invention, tape picking is accomplished by means of a completely mechanical and automatic tape picker, indicated by reference numeral 56. The tape picker 56 is pivotally mounted on the same axis as the tape guide 28, and includes a sharply tapered end portion 56a extending toward the supply tape pack 34, and an integral tape channel 56b extending from the tapered end portion 56a in a generally tangential relationship with the tape guide 28. In the tape threading operation, the supply reel 12 is first rotated in a reverse direction, to make sure that the tape leader 54 is fully engaged on the reel. Then the rotation is reversed and the tape leader 54 is picked from the supply tape pack 34 by the tapered end portion 56a of the picker, which is lightly spring biased into the tape pack. The leader 54 passes along one face of the tapered end portion 56a of the picker, through the tape channel 56b, around the tape guide 28, and into the read/write channel 22. The tape channel 56b curves partly around the tape guide 28, to emerge directly into the read/write channel 22. The tape leader 54 emerges from the channel 22 and is wrapped around the take-up reel 14 to complete the threading procedure.

As is apparent from FIGS. 2–4, the tape channel 56b is formed inside the body of the picker 56. One side of the channel 56b is defined in part by one face of the tapered end portion 56a of the picker. The other side of the channel 56b is parallel with the first side, then merges with a curved portion 56c, which functions to guide the tape leader 54 around the tape guide 28. The picker 56 also includes a tape cleaner bar 56d affixed to the side of the tape channel 56d opposite the tapered portion 56a. After the tape 32 has been threaded and has tension applied to it, the span of tape extending from the supply tape pack 34 to the tape guide 28 lightly contacts the tape cleaner bar 56d, and pivots the entire picker 56 sufficiently to lift the tapered end portion 56a clear of the tape pack, as shown in FIG. 4. In this position, the cleaner bar 56d lightly scrubs the tape 32 as it leaves the supply reel 12, to provide a desirable cleaning action. The geometrical relationship between the tape picker 56 and the supply tape pack 34 changes only slightly as the tape pack becomes smaller, since the tape picker is pivoted on the same axis as the tape guide 28. The tape span between the guide 28 and the tape pack 34 remains parallel with the tapered portion of the tape picker, and the picker remains clear of the tape pack.

During loading and unloading of the supply reel 12, the picker 56 is lifted well clear of the reel by means of camming strip 60 attached to a supply reel support plate 62. As the supply reel support plate 62 is slid to the left as shown in FIG. 4, the strip 60 contacts the picker 56 and pivots it well clear of the supply tape reel 12. For other tape loading schemes, other mechanical means would be required to lift the picker 56 clear of the supply reel 12.

FIGS. 5–8 illustrate a second embodiment of the invention having a further advantage over the first. In the second embodiment, there is a tape picker 70, having a pivot point 72 located at a midportion of the picker. A picker arm 70a extends from the pivot point 72 toward the tape pack 34, and a retractor arm 70b extends in a nearly opposite direction. The tape 32 passes about a guide post 74 located near, but not coincident with, the pivot point 72, and then passes near the end of the retractor arm 70b. After the tape has been threaded, tape tension applies a rotational force to the retractor arm 70b, rotating the whole picker 70 and lifting the picker arm 70a clear of the tape pack 34.

This embodiment of the picker has the important advantage that the retraction force supplied by the tape does not involve the face of the tape that is coated with magnetic material. Instead, the retractive force is supplied by means of the reverse side of the tape, thus minimizing potential tape damage. If a tape cleaning action is required, stationary tape cleaner 76 can be provided at a position between the tape guide 74 and the end of the retractor arm 70b. An additional advantage is that it can be made of light-weight plastic materials and is less dependent on the orientation of the tape drive.

FIGS. 7 and 8 show the construction of the picker 70 and its associated assembly more clearly. The picker assembly includes a tape guide 78 having a base portion 78a that is secured to the housing of the tape drive, and an arcuate guide wall 78b integral with the base portion 78a. The base portion 78a has a hole 80 through it for installation of the tape guide 74 on its spindle 82, and also includes a pivot post 84 to which the picker 70 is secured by means of a pivot pin 86 extending through holes in the pivot post and in two integral lugs 70c on the picker.

A third embodiment of the picker, shown in FIGS. 9–11 includes a picker 90 having a pivot point 92 at one of its ends. The picker 90 extends arcuately around and clear of a tape guide 96, and terminates in the usual tapered edge for picking the tape leader from the tape pack 34. The picker 90 also includes a portion 90b that diverges from the principal picker arm and has an opening through which the tape 32 can pass. The portion 90b functions in part as a tape guide during the picking operation. Also included within the picker is an integral tape guide 98, bearing on the outer or operational face of the tape 32. The entire structure is similar in function to the first-described embodiment, in that tape tension on the tape guide 98 causes the picker 90 to rotate about its pivot point 92, disengaging the picker from the tape pack 34. The principle difference is that the pivot point 92 is not coincident with the axis of the rotatable tape guide 96.

FIG. 11 shows how the picker 90 may be manufactured in three parts, including the main portion 90, the additional portion 90a and the integral tape guide pin 98.

It will be appreciated from the foregoing that the present invention represents a significant advance in the field of reel-to-reel tape drives. In particular, the invention provides a tape picker that operates automatically without electrical actuation, and retracts automatically when threading is complete. In addition, the picker can provide an accompanying tape cleaning action to a threaded tape, and may be easily pivoted well clear of the supply reel for loading and unloading.

It will also be appreciated that, although a specific embodiment of the invention has been described in detail for purposes of illustration, various modifications may be made without departing from the spirit and scope of the invention. Accordingly, the invention is not to be limited except as by the appended claims.

We claim:

1. A tape picking device for use in a reel-to-reel tape drive, the device comprising:
   a pivotally mounted picker body;
   a tape guide mounted at the same axis of rotation as the picker body;
   a tapered end portion extending from the picker body toward a supply tape pack, the picker body being lightly spring-biased to bias the tapered end portion into contact with the supply tape pack for tape threading;
   a tape channel formed within the picker body to direct tape from the tape pack toward the tape guide; and
   a tape cleaner bar positioned in the tape channel to engage the tape when under tension after threading, and to thereby lift the tapered end portion of the picker out of contact with the tape pack.

2. A tape picking device as set forth in claim 1, and further comprising:
   means for pivoting the picker body well clear of the tape pack for loading and unloading operations.

3. A tape picking device as set forth in claim 1, wherein:
   the tapered end portion has an outer surface that contacts the tape pack to pick a tape leader therefrom, and an inner surface that in part defines one face of the tape channel; and
   the tape channel has a second, parallel face, both faces of the channel lying in a practically tangential relation with the tape guide, and the tape channel also has an arcuate portion curving around the tape guide.

4. A tape picking device as set forth in claim 3, wherein:
   the tape cleaning bar is affixed to the second face of the tape channel.

5. A tape picking device as set forth in claim 4, and further comprising:
   means for pivoting the picker body well clear of the tape pack for loading and unloading operations.

6. A tape picking device for use in a reel-to-reel tape drive, the device comprising:
   a pivotally mounted picker having an integral tapered picker arm extending toward a supply tape pack, the picker arm being lightly spring-biased to bias the tapered arm into contact with the tape pack for tape threading purposes;
   a rotatable tape guide;
   a tape channel for directing the tape from the tape pack toward and around the rotatable tape guide; and
   retraction means integral with the picker, for automatically retracting the tapered end of the picker arm from the tape pack when tension is applied to the tape after threading is complete.

7. A tape picking device as set forth in claim 6, wherein:
   the retraction means includes a retraction arm integral with the picker and extending in a generally opposite direction to the picker, to engage the tape under tension and thereby rotate the picker away from the tape pack.

8. A tape picking device as set forth in claim 7, and further including:
   a tape cleaner bar located between the rotatable tape guide and the end of the retraction arm, to contact the tape on its operative face.

9. A tape picking device as set forth in claim 5, wherein:
   the retraction means includes means integral with the picker, for contacting the tape on its operative face, at a point in advance of the rotatable tape guide, thereby rotating the picker away from the tape pack.

10. A tape picking device as set forth in claim 9, wherein:
    the picker axis of rotation is coincident with that of the rotatable tape guide.

11. A tape picking device as set forth in claim 9, wherein:
    the picker axis of rotation is parallel to and displaced from that of the rotatable tape guide.

* * * * *